Patented Aug. 4, 1936

2,049,943

UNITED STATES PATENT OFFICE 2,049,943

PROCESS FOR OBTAINING CHLORINATED RUBBER FROM ITS SOLUTIONS

Karl Bromig, Frankfort-on-the-Main, Germany, assignor to Deutsche Gold- und Silber-Scheideanstalt vormals Roessler, Frankfort-on-the-Main, Germany, a corporation of Germany No Drawing. Application December 14, 1934, Serial No. 757,589. In Germany December 19, 1933

11 Claims. (Cl. 260—1)

My invention relates to an improvement in or modification of the process which I have described and claimed in my co-pending application S. N. 690,502, filed Sept. 11, 1933, of which the present application is a continuation-in-part.

In that application S. N. 690,502 a process is described and claimed for obtaining chlorinated rubber in the form of flakes or powder, from solutions of chlorinated rubber which comprises reducing the said solutions to a state of fine distribution by spraying or atomizing, in the presence of condensible vapours, preferably steam, at temperatures in the neighborhood of, or above, the boiling points of the solvents of the chlorinated rubber, removing the vapours of the solvents and the condensible vapours, and condensing the said vapours by cooling.

According to the process claimed in my application S. N. 690,502 the chlorinated rubber solutions are sprayed or atomized through nozzles with the aid of condensible vapours, particularly water vapour or steam, whereby the chlorinated rubber, which separates out, falls to the bottom of the vessel, whilst the vapour mixture escapes.

According to the present invention I carry out the spraying or atomizing operation of the process of the aforesaid application S. N. 690,502 in the presence of an alkaline substance, for example a caustic alkali, ammonia, an amine or the like. In this way it is possible to produce particularly stable chlorinated rubber products. Suitable alkaline compounds may, for example, be incorporated with the chlorinated rubber solution before or during the conversion of the same into finely distributed form. An advantageous procedure, for example, is to effect the introduction of the alkaline substance with the aid of the atomizing agent, e. g. water vapour or steam. Volatile or vaporizable alkaline compounds, or even fixed alkalies, may be employed for carrying out the process. These may be introduced into the process as vapour or in liquid form, for example by atomizing.

According to an embodiment of the process of my said application S. N. 690,502 the procedure may also be followed of blowing the sprayed or atomized mixture of chlorinated rubber, organic solvent and condensible vapour, for example water vapour or steam, into a suitable liquid, for example water, or disposing the atomizing nozzle in the liquid in question, for example water. The precipitated chlorinated rubber can be easily separated from the liquid.

When operating in accordance with this embodiment the procedure may, if desired, be followed of adding alkalies or the like to the liquid, into which the vapour mixture is blown. In many cases it has proved to be sufficient to subject the solid, for example spongy or flaky, chlorinated rubber obtained by the process of my aforesaid application S. N. 690,502 to a treatment with a volatile alkaline agent, for example by treating the chlorinated rubber with steam and ammonia in a centrifuge.

In carrying out the process the following procedure may, for example, be adopted:

An approximately 15% (by weight) solution of chlorinated rubber in carbon tetrachloride is sprayed together with water vapour or steam into water, which contains up to 1% of NaOH. High concentrations of alkali have in general proved not to be advisable. In order to avoid a too high concentration of the salt formed suitable quantities of fresh water are added.

Instead of adding the alkali to the water, suitable quantities of ammonia may also be added to the water vapour or steam, with which spraying is effected.

Too long contact of the precipitated chlorinated rubber with alkali lye, particularly at elevated temperature, is to be avoided as far as possible.

The following examples illustrate how the process of the invention may be carried into effect:

1. 62 litres of carbon tetrachloride, which contain 15 kgs. of chlorinated rubber in solution, are sprayed with the aid of a nozzle situated beneath the surface of water. The water is heated to 95° C. and contains 1% of NaOH. The requisite heat is supplied by the direct passing in of steam. The concentration of 1% of NaOH is maintained constant by the addition of the requisite quantity of NaOH; in order to keep the resulting NaCl content low, further fresh water is added.

The escaping carbon tetrachloride vapor is recovered in a condenser, whilst the chlorinated rubber rising to the surface of the water is removed and subjected to drying. When dry it forms a white, fine flaky product of extremely ready solubility and high stability.

2. 62 litres of carbon tetrachloride, which contain 3 kgs. of chlorinated rubber in solution, are sprayed in the same manner as in Example 1 with the aid of a nozzle into water containing 0.5% of KOH. The precipitated chlorinated rubber is covered in a centrifuge with 1% NH4OH solution, centrifuged and subjected to drying.

The resulting white fine flaky product is distinguished by great solubility and high stability.

What I claim is:

1. In the process of obtaining chlorinated rubber in finely divided form from solutions of chlorinated rubber, the step of spraying or atomizing said solutions with steam at temperatures above the boiling point of the solvent for the chlorinated rubber in the presence of alkaline substances.

2. In the process of obtaining chlorinated rubber in finely divided form from solutions of chlorinated rubber, the step of adding alkaline substances to the solution and spraying or atomizing the solution with steam at temperatures above the boiling point of the solvent for the chlorinated rubber.

3. In the process of obtaining chlorinated rubber in finely divided form from solutions of chlorinated rubber, the step of spraying or atomizing said solution with steam containing alkaline substances in vapor form at temperatures above the boiling point of the solvent for the chlorinated rubber.

4. In the process of obtaining chlorinated rubber in finely divided form from solutions of chlorinated rubber, the step of spraying or atomizing said solution with steam containing alkaline substances at temperatures above the boiling point of the solvent for the chlorinated rubber.

5. In the process of obtaining chlorinated rubber in finely divided form from solutions of chlorinated rubber, the step of spraying or atomizing said solution with steam containing ammonia at temperatures above the boiling point of the solvent for the chlorinated rubber.

6. In the process of obtaining chlorinated rubber in finely divided form from solutions of chlorinated rubber, the step of spraying or atomizing said solution with steam at temperatures above the boiling point of the solvent for the chlorinated rubber into a liquid which is immiscible with the solvent and which contains an alkaline substance.

7. In the process of obtaining chlorinated rubber in finely divided form from solutions of chlorinated rubber, the step of spraying or atomizing said solution with steam at temperatures above the boiling point of the solvent for the chlorinated rubber into water containing an alkaline substance.

8. In the process of obtaining chlorinated rubber in finely divided form from solutions of chlorinated rubber, the step of spraying or atomizing said solution with steam at temperatures above the boiling point of the solvent for the chlorinated rubber into water containing ammonia.

9. In the process of obtaining chlorinated rubber in finely divided form from solutions of chlorinated rubber, the steps of spraying or atomizing said solutions with steam at temperatures above the boiling point of the solvent for the chlorinated rubber in the presence of alkaline substances, and treating the precipitated chlorinated rubber in a centrifuge with a solution of alkaline substances.

10. A process for obtaining chlorinated rubber in solid state from its solution which consists in spraying said solution with the aid of steam below the surface of a liquefied medium which is immiscible with the solvent of chlorinated rubber and recovering the solvent from the mixed vapours passing off by condensing same, whereby to obtain a finely divided chlorinated rubber.

11. A process for obtaining chlorinated rubber in solid state from its solution which consists in spraying a solution of chlorinated rubber in carbon tetrachloride in the presence of steam below the surface of water and condensing the vapor mixture passing off by cooling, whereby to obtain a finely divided chlorinated rubber.

KARL BROMIG.